UNITED STATES PATENT OFFICE.

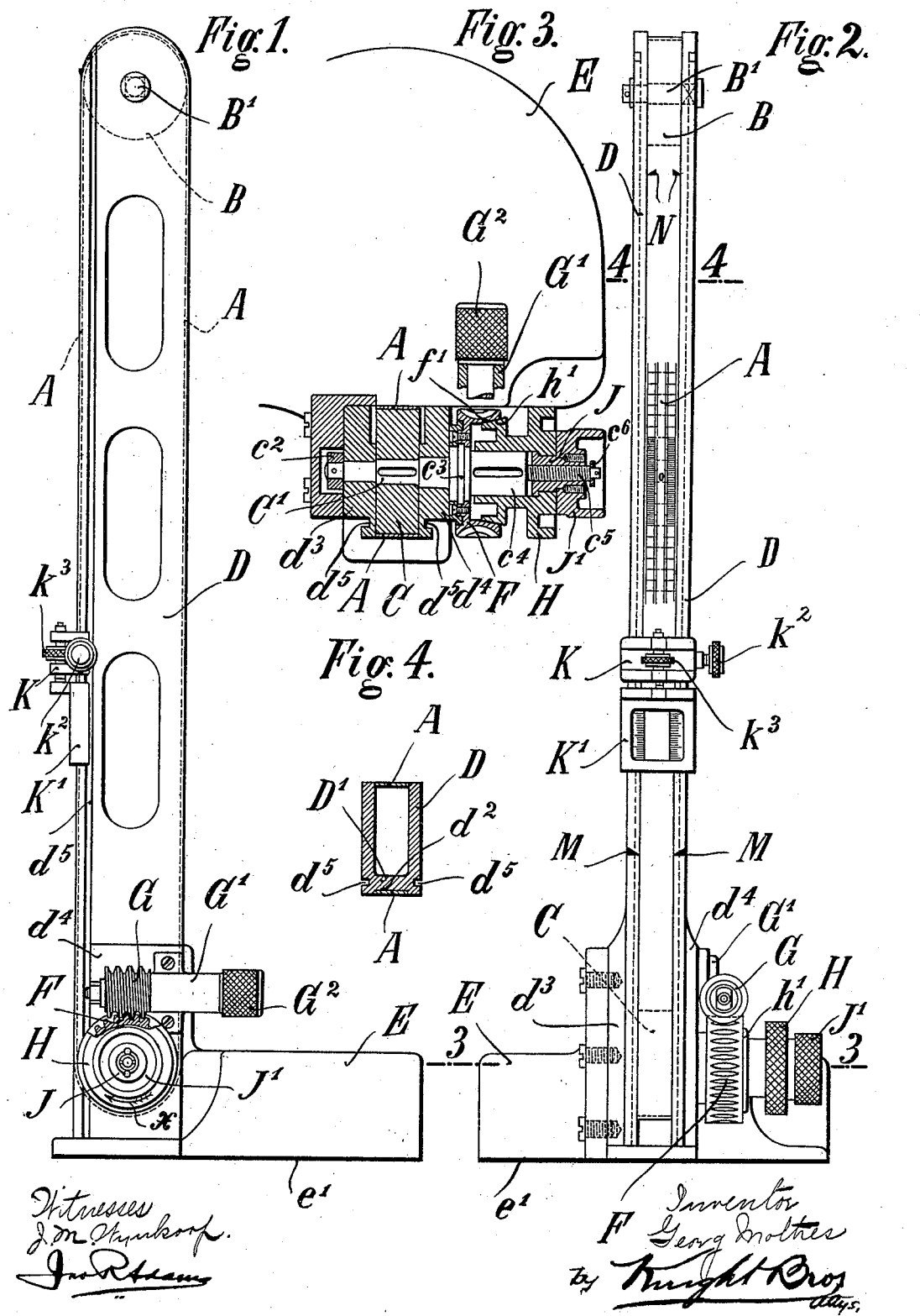

GEORG MOTHES, OF ESSEN-ON-THE-RUHR, GERMANY, ASSIGNOR TO FRIED. KRUPP AKTIENGESELLSCHAFT, OF ESSEN-ON-THE-RUHR, GERMANY.

MEASURING DEVICE.

No. 819,243.  Specification of Letters Patent.  Patented May 1, 1906.

Application filed April 6, 1905. Serial No. 254,191.

*To all whom it may concern:*

Be it known that I, GEORG MOTHES, a subject of the German Emperor, and a resident of Essen-on-the-Ruhr, Rüttenscheid, Germany, have invented certain new and useful Improvements in Measuring Devices, of which the following is a specification.

The present invention relates to measuring devices for use in marking or setting off points on work on the surface plate. It has hitherto been customary for this purpose to employ measuring-sticks arranged in a vertical position relative to the surface plate and secured in a base-plate in such a manner that the zero-point of the measuring-stick coincides with the plane of the surface plate. The use of such measuring-sticks, however, permits of the measurements of the drawing being directly used only when the said measurements are reckoned on the drawing from a base-line, which on the work to be inscribed corresponds to a plane that coincides with the plane of the surface plate.

In many instances the measurements on the drawing are reckoned from a base-line which on the work to be marked corresponds to a plane that is parallel but not coinciding with the plane of the surface-plate table. When the measuring-sticks are made use of in such case, the distance between said base-line and the plane of the surface plate has to be taken in consideration, and when the measurements are taken from the drawing this distance must be added to or subtracted from each measurement, according to whether the measurements are located above or below the base. This proceeding, however, consumes a great deal of time, and errors are likely to occur by reason of the calculation which has to be made for every measurement.

The object of the present invention is to provide a measuring device which makes it possible to take directly by the measuring device the measurements indicated on the drawing at any location of the base-line above the surface plate without necessitating previous determination of the distance between the base-line and the surface plate.

In the accompanying drawings one embodiment of the invention is shown by way of example.

Figure 1 is a side view of the measuring device. Fig. 2 is a front view of the same. Fig. 3 is a section, on an enlarged scale, taken on line 3 3, Fig. 2, and seen from above; and Fig. 4 is a section on line 4 4, Fig. 2.

An endless measuring-tape A passes over two rolls B and C, which by means of shafts B' and C' are arranged in the column-shaped part D of the frame D E. The other part of the frame D E is formed by the base-plate E, having a plane bottom face $e'$. The column D is of U-shaped cross-section. The crosspiece D', which connects the two flanges of the column, is on its outer face provided with a longitudinal guide-groove $d^2$, Fig. 4, extending vertically or at a right angle to the bottom face $e'$ of the base-plate E. The groove $d^2$ is of the same cross-section as the measuring-tape A and receives the scaled portion of the tape, which is capable of sliding in the groove.

The roll B is loosely arranged on the shaft B' to rotate thereon, while the roll C is non-rotatably secured on the shaft C'. The shaft C' in its turn is rotatably arranged in the reinforced parts $d^3$ $d^4$ of the column D and held from axial movement by means of a nut $c^2$ and a collar $c^3$. The shaft C' extends beyond the collar $c^3$ to form a cylindric part $c^4$ and a part $c^5$, provided with right-hand screw-threads. On the collar $c^3$ of the shaft C' a worm-wheel F is loosely arranged. The worm-wheel F is capable of rotation on the collar $c^3$, but held from longitudinal movement on the same. The worm-wheel engages a worm G, carrying a hand-wheel $G^2$ and having its spindle rotatably mounted in a bearing G', which is screwed onto the part $d^4$ of the column D.

On the cylindric part $c^4$ of the shaft C' a hand-wheel H is splined, so as to be incapable of rotation, but capable of axial movement. The worm-wheel F may be coupled to the hand-wheel H through the medium of a friction-clutch. To that end the hub of the hand-wheel H is provided with a cone $h'$, which corresponds to a conical recess in the interior face of the worm-wheel F. The screw-threads of the shaft part $c^5$ engage a nut J, which carries a hand-wheel J' and is rotatably connected with the hand-wheel H, but incapable of longitudinal movement relatively to the same. On the free end of the screw-spindle $c^5$ is secured a disk $c^6$, which limits the movement of the nut J on the screw-spindle. The clutch connection $f'$ $h'$ is made or broken by the turning of the hand-wheel J'. As the screw-spindle is provided with right-hand screw-threads, a turning of the hand-wheel J' in the direction of the arrow x, Fig. 1, will result in the worm-wheel F being coupled to the hand-wheel H, while a turning of the hand-wheel J' in the opposite direction will uncouple the said parts.

On the front of the column D is arranged a vernier-adjusting device K K', which is capable of sliding in grooves $d^5$ in the column D. The upper part of the vernier device can be secured in position on the column D by means of a set-screw $k^2$, while the lower part K', which carries the vernier-scale, is adjustable relatively to the part K through the medium of a micrometer-screw $k^3$, journaled in the part K.

The operation of the invention is as follows: Let it be assumed that it is desired to mark a work-piece on the surface plate after a drawing on which the measurements are reckoned from a certain base-line, which on the work-piece to be marked corresponds to a plane located a certain distance above the surface plate and parallel to the surface plate. It is then sufficient to adjust the zero-point of the endless measuring-tape to the elevation of the base-line above the plane of the surface plate, whereupon any measurements indicated in the drawing may be directly taken by the measuring device and transferred to the work-piece by means of a surface-gage in the usual manner. If, however, the measurements on the drawing are reckoned from a base-line which on the work-piece to be marked corresponds to a plane coinciding with the plane of the surface plate, one cannot directly adjust the zero-point, because the measuring-tape does not reach the surface plate. In order to make it possible also in this instance to use the measuring device, the column D is on both edges of the tape A provided with marks M, and above the zero-point the measuring-tape has marks N. The distance of the marks M from the bottom face $e'$ of the base-plate E is equal to the distance of the marks N from the zero-point of the measuring-tape. Thus when the marks N are brought to register with the marks M the zero-point will be adjusted to the plane of the surface plate—that is to say, the measuring device can also in this instance be used for directly taking the measurements indicated on the drawing.

The adjustment of the zero-point or of the marks N of the measuring-tape is in the most suitable manner effected by making the rough adjustment by turning the hand-wheel H and leaving the clutch connection $f'$ $h'$ broken. This done, the hand-wheel H is coupled to the worm-wheel F, and by turning the hand-wheel $G^2$ the fine adjustment is effected.

The vernier device K K' provides for a fine adjustment of the measuring-tape.

Having thus described my invention, what I claim, and desire to secure by Letters Patent, is—

1. A measuring device comprising a frame having a plane bottom face, a measure having a scale extending in opposite directions from a zero-point, and means for moving the measure to bring the zero-point of the scale to a position corresponding to the bottom face of the frame without projecting the measure below the bottom face of the frame.

2. A measuring device comprising a frame having a plane bottom face, a measuring-tape adjustable vertically on said frame, and having a scale extending in opposite directions from the zero-point, means guiding the tape at right angles to the bottom of the frame and means for moving the zero-point of the measuring-tape to a position corresponding to the bottom face of the frame, without projecting the measure below the bottom face of the frame.

3. A measuring device comprising a frame, an endless tape adjustable thereon, and having a scale extending in opposite directions from a zero-point, and means for guiding the tape at right angles to the bottom of the frame.

4. A measuring device comprising a frame, having a plane bottom face, a measuring-tape movable vertically on said frame, means at the bottom of the frame around which the tape passes, a mark on the measuring-tape, and a mark on the frame at such a distance above the bottom face that when the mark on the tape coincides therewith, the zero-point of the tape is in a position corresponding to the plane of the base of the bottom of the frame.

5. A measuring device comprising a frame, a measuring-tape movable on said frame, means guiding the tape at right angles to the bottom of the frame, a roller around which the tape passes, and means for adjusting the roller comprising means for giving the roller a rough adjustment and means for giving it a fine adjustment.

6. A measuring device, comprising a frame, a measure adjustable on said frame, a shaft for transmitting motion to said measure, a hand-wheel causing the shaft to turn therewith and movable axially on the shaft, a worm-wheel surrounding the shaft and with which the hand-wheel engages when moved axially in one direction and a worm for adjusting the worm-wheel.

7. A measuring device comprising a frame, having a plane bottom face, a measure movable on said frame, at right angles to the plane bottom face, and having a scale extending in opposite direction from the zero-point, a vernier adjustable on the frame over the measure to provide for fine adjustment and means for moving the measure to bring the zero-point to a point corresponding with the bottom face of the frame without projecting the measure below the bottom face of the frame.

8. A measuring device comprising a frame provided with vertical grooves, and a plane bottom face, a measure adjustable vertically on the frame and a vernier adapted to travel in the grooves on the frame and over the measure, said vernier comprising two parts one of which carries a set-screw for securing the vernier in different positions on the frame and the other of which carries a vernier-scale and is connected to the first part by a micrometer-screw.

9. A measuring device of the class described, comprising a frame having a plane bottom face, a pair of rolls rotatably arranged in said frame, an endless measuring-tape passing over said rolls, said tape having scales extending in opposite directions from a zero-point, and means for adjusting the tape within the frame.

The foregoing specification signed at Düsseldorf, Germany, this 27th day of March, 1905.

GEORG MOTHES.

In presence of—
WILLIAM ESSENWEIN,
PETER LIEBER.